United States Patent
Suzuki (10) Patent No.: US 7,132,774 B2
(45) Date of Patent: Nov. 7, 2006

(54) BOBBIN, MOTOR, AND METHOD OF WINDING MAGNET WIRE

(75) Inventor: Yuzuru Suzuki, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/920,488

(22) Filed: Aug. 18, 2004

(65) Prior Publication Data
US 2005/0040725 A1  Feb. 24, 2005

(30) Foreign Application Priority Data
Aug. 21, 2003 (JP) ............................. 2003-297993

(51) Int. Cl.
*H02K 3/34* (2006.01)
(52) U.S. Cl. ...................... 310/194; 310/261
(58) Field of Classification Search ................ 310/194, 310/261; 242/118.4, 118.6, 118.61, 118.7, 242/118.8, 115, 118, 77.3, 77.4; 335/282; 336/206, 208
See application file for complete search history.

(56) References Cited

U.S. PATENT DOCUMENTS

| | | | | |
|---|---|---|---|---|
| 3,176,932 A | * | 4/1965 | Kovaleski | 242/118.8 |
| 3,717,315 A | * | 2/1973 | Kovaleski | 242/609.1 |
| 4,602,751 A | * | 7/1986 | Vogel | 242/118.4 |
| 6,747,382 B1 | * | 6/2004 | Yajima et al. | 310/90 |
| 2002/0167243 A1 | * | 11/2002 | Horng et al. | 310/194 |

FOREIGN PATENT DOCUMENTS

JP  07-123686  5/1995

* cited by examiner

*Primary Examiner*—Tran Nguyen
(74) *Attorney, Agent, or Firm*—Townsend and Townsend and Crew LLP (57) ABSTRACT

A bobbin comprises three hollow-cylindrical sections, specifically a middle body section, and two lateral body sections. The middle body section has its diameter diminished compared to the two lateral body sections thus forming an annular recess which allows a magnet wire to be wound with an additional number of turns around the bobbin without increasing a motor size. With this bobbin structure, when the number of turns of a magnet wire is set to remain unchanged, the diameter of flanges of the bobbin can be reduced resulting in a downsized motor.

4 Claims, 5 Drawing Sheets

BOBBIN, MOTOR, AND METHOD OF WINDING MAGNET WIRE

BACKGROUND OF THE INVENTION

1. Field of the Invention

The present invention relates to a bobbin around which a magnet wire is wound, to a motor in which the bobbin is incorporated, and further to a method of winding a magnet wire around the bobbin.

2. Description of the Related Art

Figure 5:
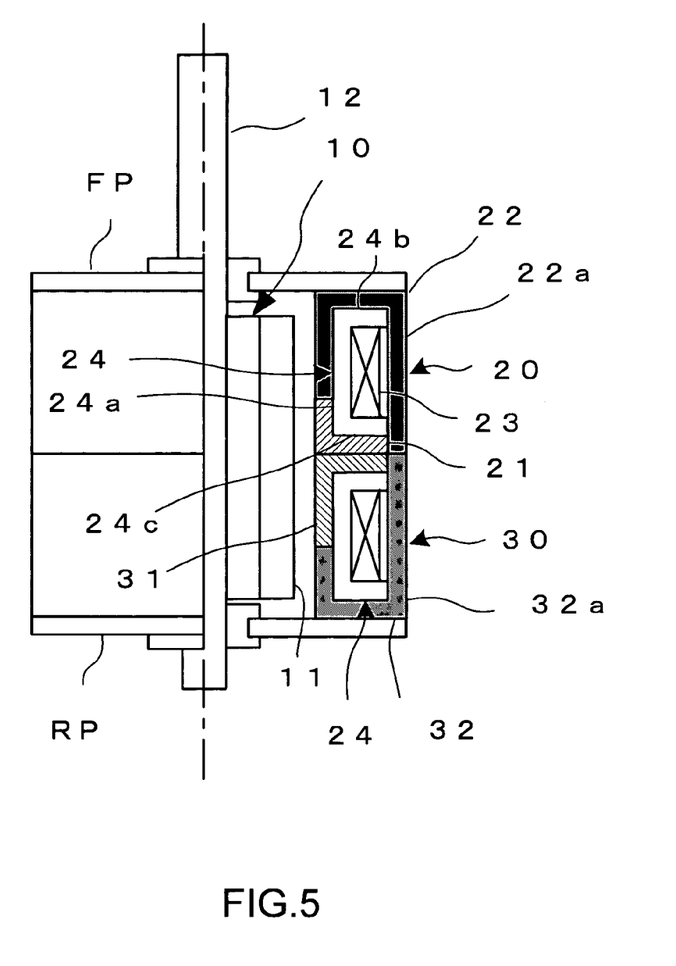
FIG. 5 is a partly cross-sectioned axial view of a conventional stepping motor.

FIG. 5 is a partly cross-sectioned axial view of a conventional stepping motor. The conventional stepping motor comprises a rotor assembly 10, and a stator assembly composed of two stator units 20 and 30.

The rotor assembly 10 is shaped substantially cylindrical, and composed of a permanent magnet with a plurality of magnetic poles 11 arranged on its outer circumference, and a rotary shaft 12 passing through the center of the magnet. The stator units 20 and 30 have respective center openings and are attached to each other coaxially, and the rotor assembly 10 is rotatably housed in the center openings.

The stator unit 20 includes yoke members 21 and 22 arranged to oppose each other, and a bobbin 24 having a magnet wire 23 wound therearound and sandwiched between the yoke members 21 and 22. The yoke member 21 has an opening corresponding to the center opening of the stator unit 20, and a plurality of pole teeth formed along its inner circumference and bent up toward the yoke member 22 so as to oppose the magnetic poles 11 of the rotor assembly 10. In the same way, the yoke member 22 has an opening corresponding to the center opening of the stator unit 20, and a plurality of pole teeth formed along its inner circumference and bet up toward the yoke member 21 so as to oppose the magnetic poles 11 of the rotor assembly 10.

The bobbin 24 includes a body section 24a, and flanges 24b and 24c provided at the both ends of the body section 24a, and a center hole with a constant diameter is formed through the body sections 24a, and the flanges 24b and 24c. The pole teeth of the yoke members 21 and 22 are inserted through the center hole of the bobbin 24 and intermesh with each other therein. An outer rim portion 22a of the yoke member 22 is bent, for example by drawing, toward the yoke member 21 for engagement therewith, thus constituting an outer circumferential wall of the stator unit 20.

The stator unit 30 includes yoke members 31 and 32 arranged to oppose each other, which are structured identical with the yoke members 21 and 22, respectively, and which sandwich a bobbin 24 having a magnet wire 23 wound therearound. An outer rim portion 32a of the yoke member 32 is bent, for example by drawing, toward the yoke member 31 for engagement therewith, thus constituting an outer circumferential wall of the stator unit 30.

A front plate FP is attached to a side of the yoke member 22 opposite to a side facing the yoke member 21, and one protruding end of the rotary shaft 12 of the rotor assembly 10 is rotatably supported by the front plate FP. A rear plate RP is attached to a side of the yoke member 32 opposite to a side facing the yoke member 31, and the other protruding end of the rotary shaft 12 of the rotor assembly 10 is rotatably supported by the rear plate RP.

As electronic devices are increasingly downsized, the stepping motor shown in FIG. 5 is requested to be downsized. One approach for answering the request is to reduce the diameter of the rotor assembly 10. This approach, however, is hitting a limit for the reason of angle resolution, and also torque characteristic.

Another approach is disclosed in Unexamined Japanese Patent Application KOKAI Publication No. H07-123686, in which the thickness of the outer rim portions 22a and 32a of the yoke members 22 and 32 are diminished, whereby the number of turns of the magnet wire 23 can be increased for increased torque when the motor size remains unchanged, or the motor can be downsized when the number of turns of the magnet wire 23 remains unchanged. This approach, however, raises a problem with mechanical strength, such as degraded reliability in protection against unforeseeable external forces. Also, when increased torque is required, the diameter of the flanges 24b, 24c of the bobbin 24 must be increased making it difficult to downsize the motor, thus preventing concurrent achievement of the downsizing and the increased torque.

SUMMARY OF THE INVENTION

The present invention has been made in light of the above circumstances, and it is an object of the present invention to achieve downsizing of a motor while retaining torque characteristic. In order to achieve the object, according to a first aspect of the present invention, a bobbin is provided which comprises: a middle body section shaped hollow-cylindrical; a first lateral body section shaped hollow-cylindrical and having a larger bore diameter and a larger outside diameter than the middle body section; a second lateral body section shaped hollow-cylindrical and having a larger bore diameter and a larger outside diameter than the middle body section; a first joining section to connect one end of the first lateral body section to one end of the middle body section in a coaxial manner; a second joining section to connect one end of the second lateral body section to the other end of the middle body section in a coaxial manner; a first flange formed at the other end of the first lateral body section so as to radially extend outward; and a second flange formed at the other end of the second lateral body section so as to radially extend outward.

In the bobbin structured as above, the winding space for a magnet wire can be increased compared to a conventional bobbin which has a constant body section diameter equal to the lateral body section diameter all the way between two flanges, whereby the number of turns of the magnet wire around the bobbin can be increased without increasing the diameter of the flanges, which results in an increased excitation force. If the number of turns of the magnet wire is set to remain unchanged, then the diameter of a circle defined by the outermost winding layer of the magnet wire can be reduced thus reducing the diameter of the flanges, whereby various electronic devices can be downsized. And, the downsizing and the increased excitation force can be concurrently achieved by appropriately setting the number of turns of the magnet wire.

In the first aspect of the present invention, the first joining section may be shaped like an annular ring oriented perpendicular to the longitudinal direction of the middle body section and the first lateral body section so as to form a step configuration, and the second joining section may be shaped like an annular ring oriented perpendicular to the longitudinal direction of the middle body section and the second lateral body section so as to form a step configuration.

In the first aspect of the present invention, the first joining section may be sloped with respect to outer surfaces of the middle body section and the first lateral body section, and the second joining section may be sloped with respect to outer surfaces of the middle body section and the second lateral body section.

According to a second aspect of the present invention, there is provided a motor comprising: a rotor assembly shaped cylindrical, having a rotary shaft fixedly attached to its center, and having a plurality of magnetic poles arranged at its outer circumference; a first yoke formed of a soft-magnetic plate, having an opening for rotatably letting the rotor assembly through, and having a plurality of pole teeth formed at a circumference thereof defined by the opening so as to oppose the plurality of magnetic poles with a predetermined clearance in-between; a second yoke formed of a soft-magnetic plate, disposed to oppose the first yoke, having an opening for rotatably letting the rotor assembly through, and having a plurality of pole teeth formed at a circumference thereof defined by the opening so as to oppose the plurality of magnetic poles with a predetermined clearance in-between; a magnetic path means to magnetically connect the first and second yokes; and a bobbin which is structured as described in the first aspect, has a magnet wire wound around the first lateral body section, the middle body section, and the second lateral body section, and which is sandwiched between the first and second yokes so as to be coaxial to the openings thereof such that an inner circumferential surface of the middle body section opposes the outer circumference of the rotor assembly with a small clearance in-between, the pole teeth of the first magnetic yoke are housed in a space formed between an inner circumferential surface of the first lateral body section and the outer circumference of the rotor assembly, and such that the pole teeth of the second magnetic yoke are housed in a space formed between an inner circumferential surface of the second lateral body section and the outer circumference of the rotor assembly.

Since the bobbin included in the motor described as above has an increased winding space for a magnet compared to a conventional bobbin which has a constant body section diameter equal to the lateral body section diameter all the way between two flanges, the number of turns of the magnet wire around the bobbin can be increased without increasing the diameter of the flanges thus without increasing the motor dimension. If the number of turns of the magnet wire is set to remain unchanged, then the diameter of a circle defined by the outermost winding layer of the magnet wire can be reduced thus reducing the diameter of the flanges, whereby the motor including the bobbin can be downsized. And, since the pole teeth of the first and second magnetic yokes are housed between respective inner circumferential surfaces of the first and second lateral body sections and the outer circumference of the rotor assembly, there is no impact on the diameter of the rotor assembly, thus the motor characteristic is not sacrificed.

In the second aspect of the present invention, there may be provided a plurality of stator units, each of which includes the first and second yokes, and the bobbin.

According to a third aspect of the present invention, there is provided a method of winding a magnet wire around a bobbin structured as described in the first aspect. The method comprises the steps of: winding a magnet wire for one layer around the first lateral body section from the other end thereof having the first flange to the one end; winding the magnet wire around the middle body section until a recess defined by difference in respective outside diameters of the middle body section and the first and second body sections is filled up; winding the magnet wire for one layer around the second lateral body section from the one end thereof to the other end having the second flange; and winding the magnet wire on top of respective outermost layers of the magnet wire wound around the first lateral body section, the middle body section, and the second lateral body section.

Since the entire body section surface is leveled all the way between the flanges before the magnet wire is wound for the entire length, there is no variation in the amount of magnet wire to be reeled in when the magnet wire is wound. This enables the magnet wire to be wound in a preferred manner without a slacked wire and variation in tension.

According to a fourth aspect of the present invention, there is provided a method of winding a magnet wire around a bobbin structured as described in the first aspect. The method comprises the steps of: winding a magnet wire around the middle body section until a recess defined by difference in respective outside diameters of the middle body section and the first and second body sections is filled up; and winding the magnet wire around the first lateral body section, an outermost layer of the magnet wire wound around the middle body section, and the second lateral body section.

Since the recess around the middle body section is first filled up with the magnet wire wound so as to level the entire body section surface all the way between the flanges, there is no variation in the amount of magnet wire to be reeled in when the magnet wire is wound, thus the magnet wire can be wound in a preferred manner without a slacked wire and variation in tension.

DETAILED DESCRIPTION OF THE PREFERRED EMBODIMENTS

A first embodiment of the present invention will be described with reference to FIGS. 1 and 2.

Figure 1:
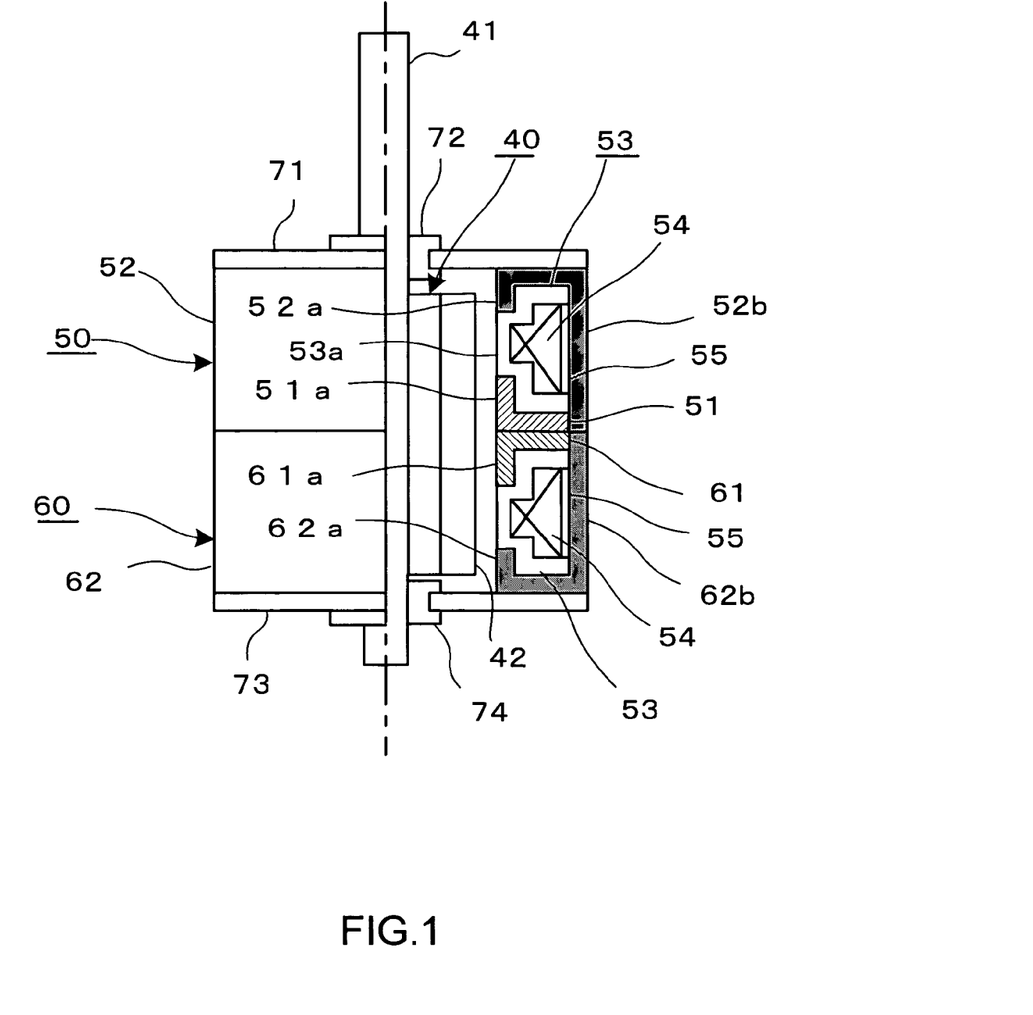
FIG. 1 is a partly cross-sectioned axial view of a stepping motor including a bobbin according to a first embodiment of the present invention.

A stepping motor shown in FIG. 1 is capable of two-phase driving, and comprises a rotor assembly 40, and two stator units 50 and 60.

The rotor assembly 10 is shaped substantially cylindrical, and is composed of a permanent magnet with a plurality of magnetic poles 42, and a rotary shaft 41 passing through the center of the magnet.

The stator unit 50 includes first and second yokes 51 and 52 arranged to oppose each other, and a bobbin 53. The bobbin 53 has a magnet wire 54 wound therearound, and an insulator 55 is disposed around the magnet wire 54 wound. The bobbin 53 is sandwiched between the first and second yokes 51 and 52.

The first yoke 51 is punched out of a soft-magnetic plate into a disk having at its center a circular opening for letting the rotor assembly 40 through. A plurality of pole teeth 51*a* are formed along an inner circumference of the first yoke 51 defined by the circular opening and are bent up perpendicularly toward the second yoke 52 so as to closely oppose the magnetic poles 42 of the rotor assembly 40.

The second yoke 52 is punched out of a soft-magnetic plate into a disk having at its center a circular opening for letting the rotor assembly 40 through, and disposed to oppose the first yoke 51 so as to sandwich the bobbin 53 therebetween. A plurality of pole teeth 52a are formed along an inner circumference of the second yoke 52 defined by the circular opening and are bent up perpendicularly toward the first yoke 51 so as to closely oppose the magnetic poles 42 of the rotor assembly 40. An outer rim portion 52b of the second yoke 52 is bent, for example by drawing, toward the first yoke 51 so as to engage therewith. The outer rim portion 52b of the second yoke 52 constitutes a magnetic path means to magnetically connect the first and second yokes 51 and 52. The pole teeth 52a of the second yoke 52 are shifted in phase by 180 degrees from the pole teeth 51a of the first yoke 51.

Figure 2:
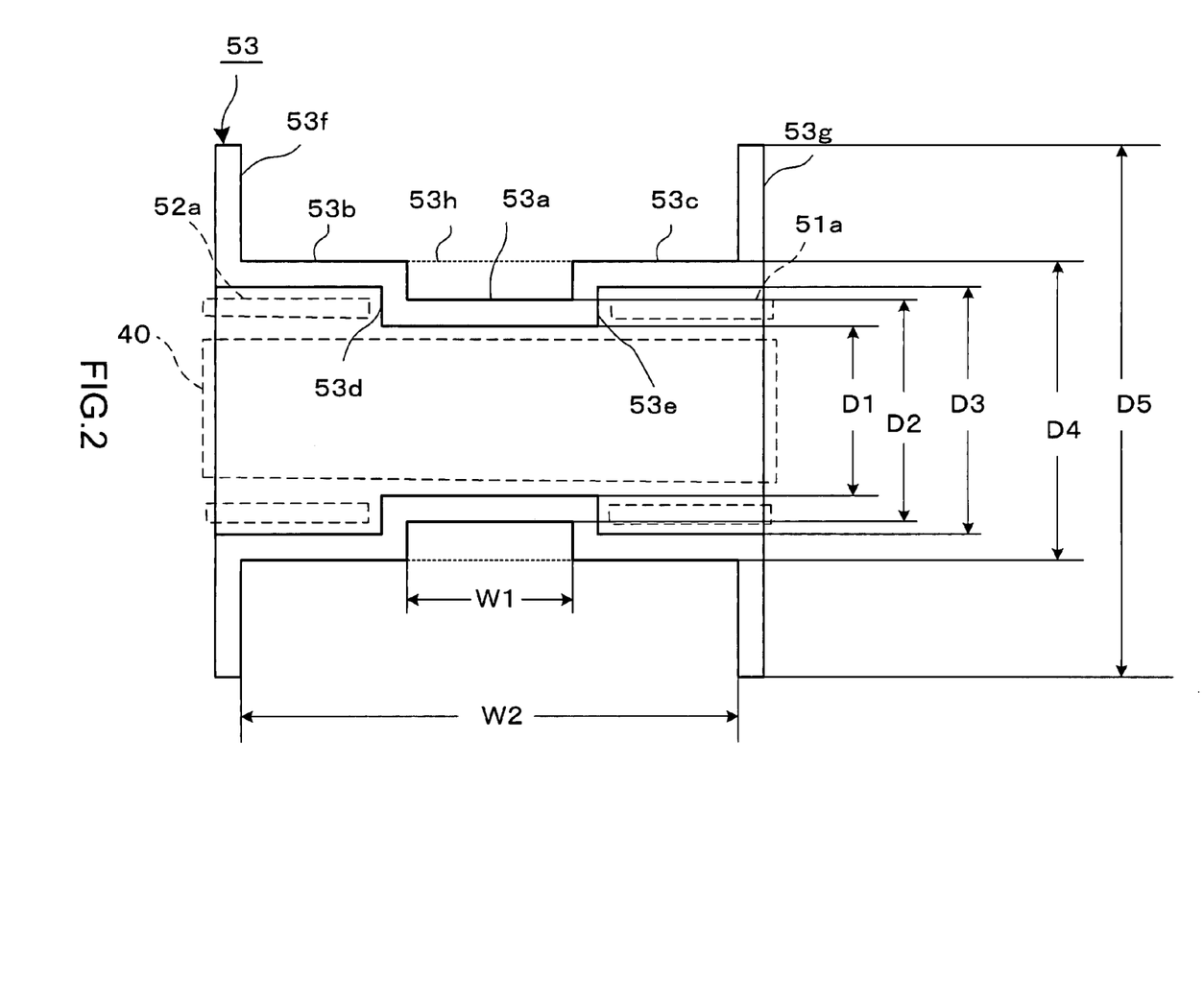
FIG. 2 is a cross-sectional view of the bobbin shown in FIG. 1.

The bobbin 53 is formed of synthetic resin or the like, and includes, as shown in FIG. 2, a middle body section 53a shaped hollow-cylindrical, and two lateral body sections 53b and 53c shaped hollow-cylindrical and disposed coaxially to the middle body section 53a. One end of the middle body section 53a is connected to one end of the lateral body section 53b via a joining section 53d, and the other end of the middle body section 53a is connected to one end of the lateral body section 53c via a joining section 53e. Respective hollows of the middle body section 53a, and the lateral body sections 53d and 53c are coaxial to one another. The joining section 53d is oriented perpendicular to the outer surface of the middle body section 53a and the inner surface of the lateral body section 53b. The joining section 53e is oriented perpendicular to the outer surface of the middle body section 53a and the inner surface of the lateral body section 53c.

The middle body section 53a has a bore diameter D1 larger than the diameter of the rotor assembly 40 and substantially equal to the diameter of the circular openings of the first and second yokes 51 and 52. The lateral body sections 53b and 53c have a bore diameter D3 larger than the bore diameter D1 of the middle body section 53a so as to form respective spaces to house the pole teeth 51a and 52a. The middle body section 53a has an outside diameter D2 smaller than an outside diameter D4 of the lateral body sections 53b and 53c, thus the bobbin 53, unlike a conventional bobbin, has an annular recess 53h formed around the middle body section 53a.

A flange 53f is formed at the distal end of the lateral body section 53b so as to radially extend outward, and a flange 53g is formed at the distal end of the lateral body section 53c so as to radially extend outward. The flanges 53f and 53g are parallel to each other and have a same outside diameter D5. The distance between the outer face of the flange 53f and the joining section 53d is larger than the length of the pole teeth 52a, and the distance between the outer face of the flange 53g and the joining section 53e is larger than the length of the pole teeth 51a.

The stator unit 60 includes first and second yokes 61 and 62 arranged to oppose each other, and a bobbin 53. The first yoke 61 is structured and made identically with the first yoke 51, and has a circular opening at its center, and a plurality of pole teeth 61a are formed along an inner circumference of the first yoke 61 defined by the circular opening and are bent up perpendicularly toward the second yoke 62. The second yoke 62 is structured and made identically with the second yoke 52, and has a circular opening at its center, and a plurality of pole teeth 62a are formed along an inner circumference of the second yoke 62 define by the circular opening a and are bent up perpendicularly toward the first yoke 61. The first and second yokes 61 and 62 sandwich the bobbin 53 which has the same structure as described above in explaining the stator unit 50, and which has a magnet wire 54 wound therearound, and an insulator 55 is disposed around the magnet wire 54 wound.

The stator units 50 and 60 structured as described above are coaxially put together such that the first yoke 51 of the stator unit 50 is welded to the first yoke 61 of the stator unit 60. A front plate 71 is attached to a side of the second yoke 52 opposite to a side facing the first yoke 51, and a bearing 72 to rotatably support the rotary shaft 41 of the rotor assembly 40 is attached to the front plate 71. A rear plate 73 is attached to a side of the second yoke 62 opposite to a side facing the first yoke 61, and a bearing 74 to rotatably support the rotary shaft 41 is attached to the rear plate 73. The rotor assembly 40 with the rotary shaft 41 is held coaxial to the stator units 50 and 60 by means of the bearings 72 and 74.

When the rotor assembly 40 with the rotary shaft 41 is held coaxial to the stator units 50 and 60 as described above, the inner surfaces of respective middle body sections 53 of the two bobbins 53 are positioned close to the outer circumferential surface of the rotor assembly 40 such that the pole teeth 51a are housed in a space defined by the rotor assembly 40, and the lateral body section 53c and the joining section 53e of the bobbin 53 sandwiched between the first and second yokes 51 and 52 so as to oppose the magnetic poles 42 with a small air gap in-between, and such that the pole teeth 52a are housed in a space defined by the rotor assembly 40, and the lateral body section 53b and the joining section 53d of the bobbin 53 sandwiched between the first and second yokes 51 and 52 so as to oppose the magnetic poles 42 with a small air gap in-between. And in the same way, the pole teeth 61a are housed in a space defined by the rotor assembly 40, and the lateral body section 53c and the joining section 53e of the bobbin sandwiched between the first and second yokes 61 and 62 so as to oppose the magnetic poles 42 with a small air gap in-between, and the pole teeth 62 are housed in a space defined by the rotor assembly, and the lateral body section 53b and the joining section 53d of the bobbin 53 sandwiched between the first and second yokes 61 and 62 so as to oppose the magnetic poles 42 with a small air gap in-between.

In the stepping motor structured above, when current is applied to respective magnet wires 54, the pole teeth 51a, 52a, 61a and 62a of the yokes 51, 52, 61 and 62 are excited, whereby attraction and repulsion forces are generated between the magnetic poles 42 and the pole teeth 51a, 52a, 61a and 62a causing the rotor assembly with the rotary shaft 41 to rotate.

The bobbin 53 is provided with the annular recess 53h formed around the middle body section 53a, and the magnet wire 54 is wound also at the recess 53h, which means provision of an additional winding space compared to a conventional structure. Accordingly, the stepping motor shown in FIG. 1 has following advantages:

(1) The total length L of the magnet wire 54 allowed to be wound around the bobbin 53 is obtained as follows (the thickness of the insulator 55 is ignored).

The number of rows N1 per layer of the magnet wire 54 allowed to be wound in the space of the recess 53h is given by $$N1 = W1/d \text{ (decimals omitted)}$$

where W1 is the axial dimension of the recess 53h, and d is the diameter of the magnet wire 54.

The number of layers M1 of the magnet wire 54 allowed to be wound in the space of the recess 53h is given by $$M1=(D4-D2)/2/d \text{ (decimals omitted).}$$

So, the number of turns T1 of the magnet wire 54 allowed to be wound in the space of the recess 53h is given by $$T1=N1 \times M1.$$

Therefore, the length L1 of the magnet wire 54 allowed to be wound in the space of the recess 53h is calculated by the following formula A:

$$L1 = N1 \times (D2+1 \times d)\pi + N1 \times (D2+2 \times d)\pi + \ldots + N1 \times (D2+M1 \times d)\pi$$
$$= N1 \times M1 \times \pi \times (D2+(M1+1) \times d/2)$$

Now, the number of rows N2 per layer of the magnet wire 54 allowed to be wound around the bobbin 53 including the area covering the space of the recess 53h is given by $$N2=W2/d \text{ (decimals omitted)}$$

where W2 is the distance between the inner faces of the flanges 53f and 53g.

The number of layers M2 of the magnet wire 54 allowed to be wound around the bobbin 53 except the area covering the space of the recess 53h is given by $$M2=(D5-D4)/2/d \text{ (decimals omitted).}$$

So, the number of turns T2 of the magnet wire 54 allowed to be wound around the bobbin 53 excluding the space of the recess 53h is given by $$T2=N2 \times M2.$$

Therefore, the length L2 of the magnet wire 54 allowed to be wound around the bobbin 53 excluding the space of the recess 53h is calculated by the following formula B:

$$L2 = N2 \times (D4+1 \times d)\pi + N2 \times (D4+2 \times d)\pi + \ldots + N2 \times (D4+M2 \times d)\pi$$
$$= N2 \times M2 \times \pi \times (D4+(M2+1) \times d/2)$$

Accordingly, the total length L of the magnet wire 54 allowed to be wound around the bobbin 53 including the space of the recess 53 is roughly obtained based on the length L1 and the length L2 as follows $$L=L1+L2$$

Here, since the length L2 obtained by the formula B is equivalent to the winding length of a magnet wire allowed to be wound around a conventional bobbin, the length L1 obtained by the formula A constitutes an additional winding length and therefore an additional number of turns when compared to the conventional bobbin. Thus, the excitation force generated can be increased.

(2) The advantage (1) described above is derived from the case where the outside diameter D5 of the flanges 53f and 53g is set to match that of a conventionally structured bobbin. Now, in case if the number of turns of the magnet wire 54 is set to match that allowed on a conventional bobbin, the outside diameter D5 of the flanges 53f and 53g can be reduced, whereby the radial dimension of a motor can be reduced.

(3) Considering the above-described advantages (1) and (2), both increase in the excitation force of the magnet wire 54 and reduction in the outside diameter D5 of the flanges 53 and 53g can be concurrently achieved by appropriately determining the dimension of the recess 53h.

A second embodiment of the present invention will be described with reference to FIG. 3.

Figure 3:
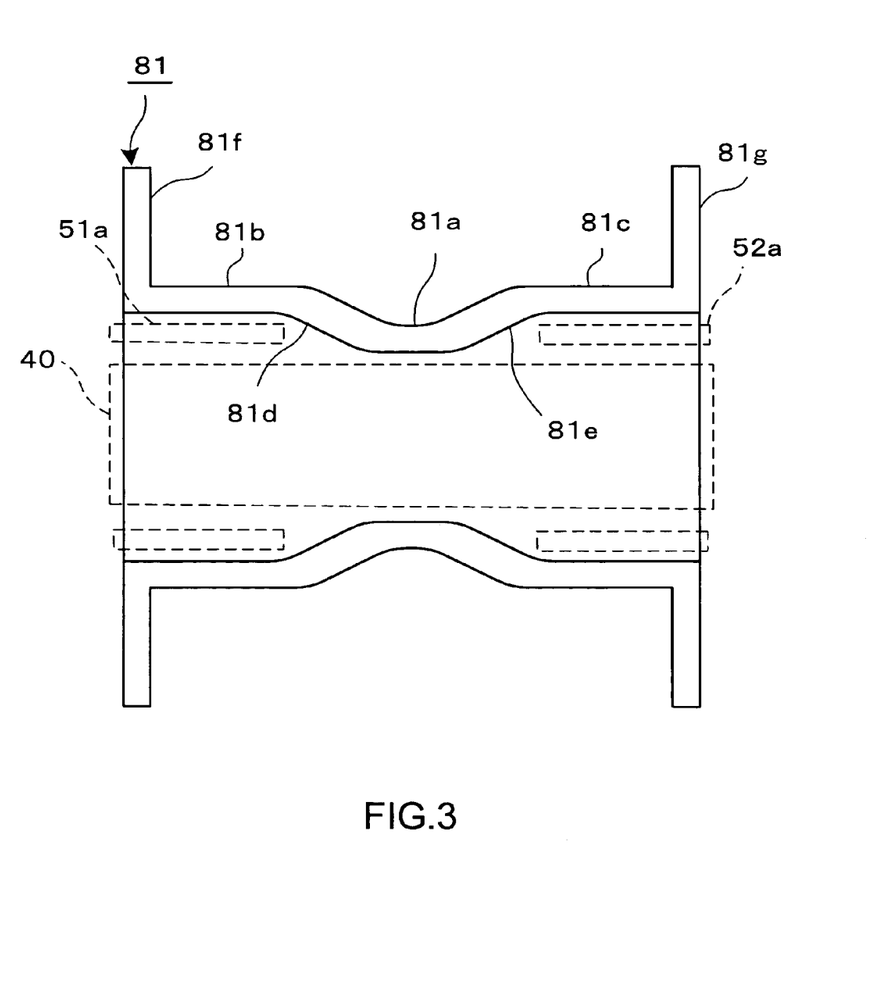
FIG. 3 is a cross-sectional view of a bobbin according to a second embodiment of the present invention.

A bobbin 81 shown in FIG. 3 is formed of synthetic resin, and comprises a middle body section 81a shaped hollow-cylindrical, and two lateral body sections 81b and 81c shaped hollow-cylindrical and having a larger diameter than the middle body section 81a. One end of the middle body section 81a is connected to one end of the lateral body section 81b via a joining section 81d with a gradual change in diametrical dimension thus not forming a step configuration, and the other end of the middle body section 81a is connected to one end of the lateral body section 81c via a joining section 81e with a gradual change in diametrical dimension thus not forming a step configuration. The hollows of the middle body section 81a, and the lateral body sections 81b and 81c are set coaxial to one another. A flange 81f is formed at the distal end of the lateral body section 81b so as to radially extend outward, and a flange 81g is formed at the distal end of the lateral body section 81c so as to radially extend outward.

In the bobbin 81 structured above, when a magnet wire is wound, for example from the flange 81f to the flange 83g, unbalance with respect to amounts of the magnet wire to be reeled out and reeled in, which is caused due to the difference in length of one turn of the magnet wire between around the middle body section 81a and around the lateral body sections 81b and 81c, does not appear drastically thanks to the diametrical dimension changing gradually at the joining portions between the middle body section 81a and the lateral body sections 81b and 81c and therefore can be absorbed, whereby the magnet wire can be wound in a preferable manner.

A third embodiment of the present invention will be described with reference to FIG. 4. The third embodiment relates to a method for preferably winding a magnet wire around such a bobbin as having a structure described above in the first embodiment, and the description will be made with reference to the bobbin 53.

Figure 4:
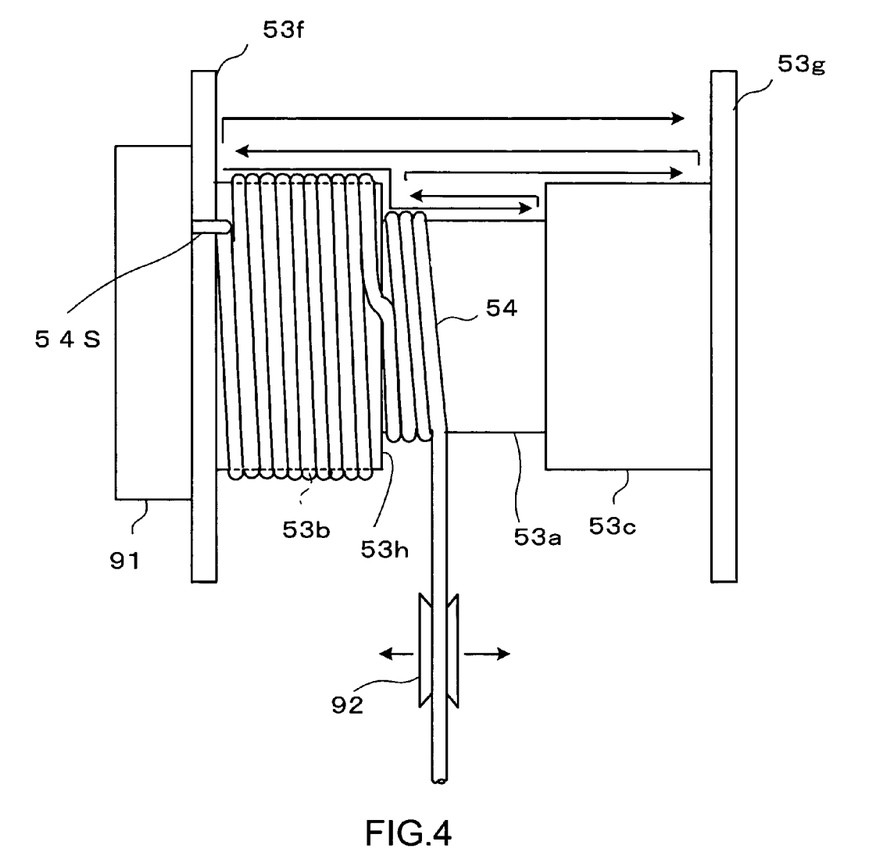
FIG. 4 is an explanatory view of a method of winding a magnet wire according to a third embodiment of the present invention.

Referring to FIG. 4, the bobbin 53 is set on a rotating mechanism 91 of a winding apparatus, and a starting end 54S of the magnet wire 54 is fixed to the flange 53f by a tape (not shown), or the like. The rotating mechanism 91 is such as to rotate the bobbin 53 about its axis. A traverse roll 92 is positioned to the inner face of the flange 53f so that the magnet wire 54 can be wound starting from the distal end of the lateral body section 53b. The traverse roll 92 is made to work in conjunction with the rotating mechanism 91 via a mechanism (not shown) so as to reciprocate the magnet wire 54 in a direction along the axis of the bobbin 53. The winding apparatus has various sensors (not shown) as well as the rotating mechanism 91 and the traverse roll 92. Among the sensors are a sensor to detect the position of the traverse roll 92 to thereby change the traveling direction thereof, and a sensor to detect the amount of the magnet wire 54 wound in the recess 53h of the bobbin 53 (specifically the diameter of a circle defined by the outermost layer of the magnet wire 54 wound around the middle body section 53a).

After the traverse roll 92 is duly positioned as described above, the rotating mechanism 92 is driven. When the rotating mechanism 91 is driven, the bobbin 53 rotates about its axis, and the magnet wire 54 is wound around the bobbin 53 starting from the distal end of the lateral body section 53b. The traverse roll 92 travels to the one end of the middle body section 53a thereby completing the first winding layer around the lateral body section 53b, and then the magnet wire 54 is wound around the middle body section 53a for one layer while the traverse roll 92 travels to the other end of the middle body section 53a. When the traverse roll 92 reaches the other end of the middle body section 53a and has its position sensed, the traveling direction of the traverse roll 92 is reversed, and then the magnet wire 54 is wound around the middle body section 53a from the other end thereof back to the one end for the second winding layer. When the traverse roll 92 reaches the one end of the middle body section 53 and has its position sensed, the traveling direction is reversed. Thus, the magnet wire 54 is wound in the recess 53h of the bobbin 53 in a reciprocating manner.

When it is sensed that the diameter of a circle defined by the outermost layer of the magnet wire 54 wound around the middle body section 53a is equal to the diameter of a circle defined by the one layer of the magnet wire 54 wound around the lateral body section 53b, which means that the recess 53h is filled up with the magnet wire 54 wound, the traverse roll 92 has its traveling direction no longer reversed at the other end of the middle body section 53a and continues to travel toward the flange 53g, whereby the magnet wire 54 is wound around the lateral body section 53c. When the traverse rolls 92 reaches the inner face of the flange 53g and has its position sensed, the traveling direction of the traverse roll 92 is reversed toward the flange 53f. Thereafter, the traverse roll 92 is adapted to have its traveling direction reversed at the inner faces of the flanges 53f and 53g so that the magnet wire 54 is wound around the bobbin 53 all the way between the flanges 53f and 53g.

Thus, since the recess 53h around the middle body section 53a is first filled up with the magnet wire 54 thereby eliminating the step configurations formed at the joining sections 53d and 53e, the magnet wire 54 can then be wound in a level manner all the way from the flange 53f to the flange 53g, which enhances winding quality.

It should be understood that the present invention is not limited to the specific embodiments described in this specification, and various modifications are possible in light of the above teaching. For example, the present invention may be applied to a sing-phase driving stepping motor, and also a three or more-phase driving stepping motor. Also, in the third embodiment, the magnet wire 54 is wound around the lateral body section 53b for one layer before filling up the recess 53h, but the magnet wire 54 may alternatively be wound around the middle body section 53 from the start to fill up the recess 53h. Therefore, it is intended that the scope of the present invention be defined by the following claims.

This application is based on Japanese Patent Application No. 2003-297993 filed on Aug. 21, 2003 and including specification, claims, drawings and summary. The disclosure of the above Japanese Patent Application is incorporated herein by reference in its entirety.

What is claimed is:

1. A stepping motor comprising:
    a rotor assembly shaped cylindrical, having a rotary shaft fixedly attached to its center, and having a plurality of magnetic poles arranged at its outer circumference;
    a first yoke formed of a soft-magnetic plate, having an opening for rotatably letting the rotor assembly through, and having a plurality of pole teeth formed at a circumference thereof defined by the opening so as to oppose the plurality of magnetic poles with a predetermined clearance in-between;
    a second yoke formed of a soft-magnetic plate, disposed to oppose the first yoke, having an opening for rotatably letting the rotor assembly through, and having a plurality of pole teeth formed at a circumference thereof defined by the opening so as to oppose the plurality of magnetic poles with a predetermined clearance in-between;
    a magnetic path means to magnetically connect the first and second yokes; and a bobbin including
    a middle body section shaped hollow-cylindrical,
    a first lateral body section shaped hollow-cylindrical and having a larger bore diameter and a larger outside diameter than the middle body section,
    a second lateral body section shaped hollow-cylindrical and having a larger bore diameter and a larger outside diameter than the middle body section,
    a first joining section to connect one end of the first lateral body section to one end of the middle body section in a coaxial manner,
    a second joining section to connect one end of the second lateral body section to the other end of the middle body section in a coaxial manner,
    a first flange formed at the other end of the first lateral body section so as to radially extend outward, and
    a second flange formed at the other end of the second lateral body section so as to radially extend outward,
    the bobbin having a magnet wire wound around the first lateral body section, the middle body section, and the second lateral body section, the bobbin having a distance between an outer face of the first flange and the first joining section larger than the length of the plurality of pole teeth of the first yoke and a distance between an outer face of the second flange and the second joining section larger than the length of the plurality of pole teeth of the second yoke such that the plurality of pole teeth of the first and second yokes are housed inside of the first and second lateral body section respectively.

2. A stepping motor according to claim 1, wherein a plurality of stator units are provided, each of the stator units including the first and second yokes, and the bobbin.

3. A stepping motor according to claim 1, wherein the first joining section is shaped like an annular ring oriented perpendicular to a longitudinal direction of the middle body section and the first lateral body section so as to form a step configuration, and wherein the second joining section is shaped like an annular ring oriented perpendicular to the longitudinal direction of the middle body section and the second lateral body section so as to form a step configuration.

4. A stepping motor according to claim 1, wherein the first joining section is sloped with respect to outer surfaces of the middle body section and the first lateral body section, and wherein the second joining section is sloped with respect to outer surfaces of the middle body section and the second lateral body section.

* * * * *